SERIAL MEMORY

Filed Oct. 29, 1954 4 Sheets-Sheet 1

INVENTORS
Charles H. Propster, Jr.
& Kun Li Chien
BY Morris A. Rabkin
ATTORNEY

Sept. 29, 1959 KUN LI CHIEN ET AL 2,907,004

SERIAL MEMORY

Filed Oct. 29, 1954 4 Sheets-Sheet 2

INVENTORS
Charles H. Propster, Jr.
& Kun Li Chien
BY Morris A. Rabkin
ATTORNEY

INVENTORS
Charles H. Propster, Jr.
& Kun Li Chien
BY Morris Rabkin
ATTORNEY

INVENTORS.
Charles H. Propster, Jr.
& Kun Li Chien
BY Morris Rabkin
ATTORNEY.

United States Patent Office 2,907,004

Patented Sept. 29, 1959

2,907,004

SERIAL MEMORY

Kun Li Chien and Charles H. Propster, Jr., Haddonfield, N.J., assignors to Radio Corporation of America, a corporation of Delaware Application October 29, 1954, Serial No. 465,586

17 Claims. (Cl. 340—174)

This invention relates to digital information handling systems, and particularly to an information storage system that may be used to convert information rates.

Generally, in an electronic digital computer, the information that is handled by the input and output devices of the computer is in sequential form. Difficulties arise in transferring information from one device to the other, because the rates at which the input and output devices can handle information may vary considerably. For example, an electric typewriter can print successive characters at a rate of about ten per second, while the sequential information rate for magnetic tape may be of the order of a thousand times faster. Notwithstanding this large discrepancy in information rates, it is often desirable to transfer information from one device to another, such as from magnetic tape to an electric typewriter. Another aspect of the problem is that the information rates of these computer devices generally are not uniform. Therefore, these devices cannot be synchronized to a common timing reference. For example, if the information comes from magnetic tapes, there may be variable gaps between information units. If the output device is a typewriter, a variable information rate results from the extra time required for such operations as carriage return and case shift.

In order to operate the input and output devices, a time transfer system or information storage is required to convert the information rate of one device to that of the other. Thus, to transfer information from magnetic tape to a typewriter, the information rate from the tape must be decreased. Besides, to operate the output device at maximum speed, information must always be available to the output device without waiting.

Accordingly, it is among the objects of this invention to provide:

A new and improved system for transferring information between information handling devices that operate at different rates;

A new and improved rate converting system that permits transfer of information at maximum speeds;

A new and improved information storage system that may be used as an information rate converter;

A new and improved information storage system for controlling the rate of information transfer in the proper sequence;

A new and simple information storage system that may be operated nonsynchronously and that is reliable and economical in construction.

In accordance with this invention, an information storage system is employed for transferring information between information handling devices that have different information rates. The information units are written in and read out of an information storage device at the different information rates. Apparatus for regulating writing of information units in the storage device includes means for determining when the storage device is full and less than full and for producing two different signals, respectively. A means responsive to the signals enables the write-in of information whenever the storage device is less than full and inhibits such write-in when the storage device is full. Apparatus for regulating reading out of information from the storage device includes means for producing different signals when the storage device is empty and not empty and for inhibiting or enabling the read out accordingly.

The foregoing and other objects, the advantages and novel features of this invention, as well as the invention itself both as to its organization and mode of operation, may be best understood from the following description when read in connection with the accompanying drawing, in which like reference numerals refer to like parts, and in which.

Figure 1:
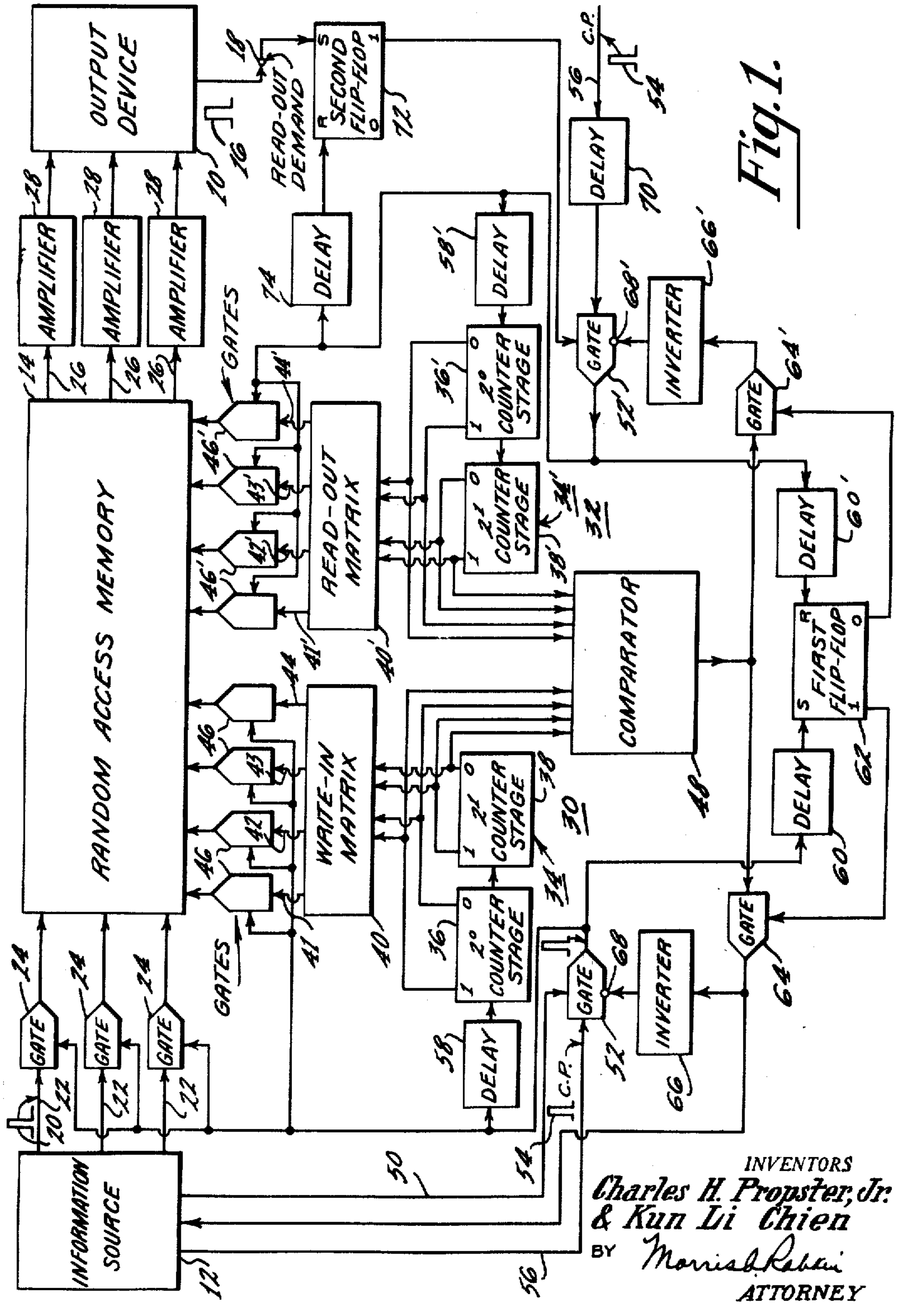
Figure 1 is a schematic block diagram of a memory control system and information rate converter embodying this invention.

With reference to Figure 1, on the right an output device 10 is shown which may be considered as operating at a relatively low information rate. At the left is an input device or information source 12 which operates at a relatively high information rate. A random access memory 14 and a control system therefor are employed for transferring information from the high-rate source 12 to the low-rate output device 10 at information rates that are compatible to both the source and the output device.

The ouput device 10 may be an electromechanical device such as a typewriter, printer, or tape perforator. Such devices generally complete an operation by the making or breaking of a circuit. This action (make or break) may be utilized to derive a "ready" or "demand" electric signal to indicate that the output device 10 is in condition to receive the next unit of information and perform the required operation. This demand signal is shown as a rectangular pulse 16 that is applied to a terminal 18 of the memory control system.

The information source 12 may be a cyclic memory such as a magnetic drum that is rotated continuously. The signals from the source 12 may take the form of a pulse 20 and the absence of a pulse and are produced at parallel output channels 22. Combinations of signals occurring at the same time at the parallel channels 22 form a code group that is treated as an information unit and hereinafter called an information character. Only three information channels 22 are shown in the system of Figure 1 by way of illustration. However, as many information channels as desired may be employed. Each channel 22 from the information source 12 is connected to one input of a different two-input "and" gate 24. The outputs of the gates 24 are connected to the inputs of the random access memory 14. The memory 14 has the same number of information channels as there are channels 22 from the source 12. The memory 14 has a plurality of locations for separately storing a plurality of characters. The memory 14 is assumed to have a capacity of storing four characters for purpose of illustration. Signals read out of the memory are produced on separate channels 26 which are connected to separate amplifiers 28. The outputs of the amplifiers 28 are connected to the output device 10.

The memory control system has as write-in portion 30 and a read-out portion 32. Corresponding elements of the write-in and read-out portions 30, 32 are given the same reference numerals. The reference numerals for the read-out elements are distinguished by the addition of a prime ('). A write-in counter 34 that has the same count capacity as the storage capacity of the memory 14 is employed to count the number of characters written into the memory 14. The counter 34 is of the binary type made up of two stages 36, 38 that provide four distinct counts from zero to three and that recycle to zero upon the count of four. The outputs of each counter stage 36, 38 may be assumed to be a high-voltage at the 0-output and a low-voltage at the 1-output when the stage registers the count of zero, and the reverse voltage outputs when the stage registers the count of one. The outputs of the write-in counter 34 are connected to the inputs of a write-in converter switch or matrix 40. This matrix 40 provides a high-voltage signal on a different one of four output channels 41 to 44 for each of the four counts registered in the counter 34. The matrix output channels 41 to 44 are connected through separate two-input "and" gates 46 to the memory 14. An information character from the source 12 is written in the one of the four memory locations that corresponds to the matrix output channel 41 to 44 having the high-voltage signal. The outputs of the write-in counter 34 are also applied to a comparator 48. Similarly, the outputs of the read-out counter 34' are applied to the same comparator 48. The comparator 48 compares the counts of the write-in and read-out counters 34, 34' and produces a high output voltage when the counts are equal and a low voltage when they are unequal.

The information source 12 provides an enabling voltage level when it is in condition to send out information characters in the proper sequence. This enabling voltage appears on channel 50 and is applied to one input of a three-input "and" gate, 52 having also an "inhibit" input 68. The information source 12 also provides a clock pulse 54 for each information character that is in the source 12. This clock pulse appears on channel 56 and is applied to another input of the gate 52. The output of the gate 52 is applied to the other inputs of the input gates 24 and also to the other inputs of the matrix gates 46. The output of the gate 52 is also applied through a delay line 58 to the input of the write-in counter 34 and through another delay line 60 to the set side of a first flip-flop 62.

The flip-flop 62 may be a bistable trigger circuit having two input terminals designated S (set) and R (reset) and two output terminals designated "1" and "0". Application of a signal to the S terminal sets the flip-flop circuit with its 1-output established at a relatively high voltage level and its 0-output at a low voltage level. Application of a signal to the R terminal resets the trigger circuit in the reverse condition. The 1-output of the first flip-flop 62 is connected to one input of a two input "and" gate 64. The output of the comparator 48 is connected to the other input of this gate 64. The output of the gate 64 is connected to the inhibit input 68 of the gate 52 through a phase inverter 66. This inhibit input 68 of the gate 52 is designated by a small circle. The output of the gate 64 is also applied to the information source 12.

Corresponding parts of the read-out portion 32 of the memory control system are connected and operate in the manner described above except that the 0-output of the first flip-flop 62 is connected to gate 64', and the clock pulse 54 from the source 12 is applied through a delay line 70 to the inhibit gate 52'. In addition, the read-out demand pulse 16 at terminal 18 is applied to the set side of a second flip-flop 72. The 1-output of the second flip-flop 72 provides an enabling voltage level for the inhibit gate 52'. The output of the inhibit gate 52' is applied through a delay line 74 to reset the second flip-flop 72. The location of a stored character to be read out of the memory 14 is designated by a high voltage on one of the read-out matrix output channels 46'. The memory locations are arranged to be the same for corresponding write-in and read-out counts.

Figure 2:
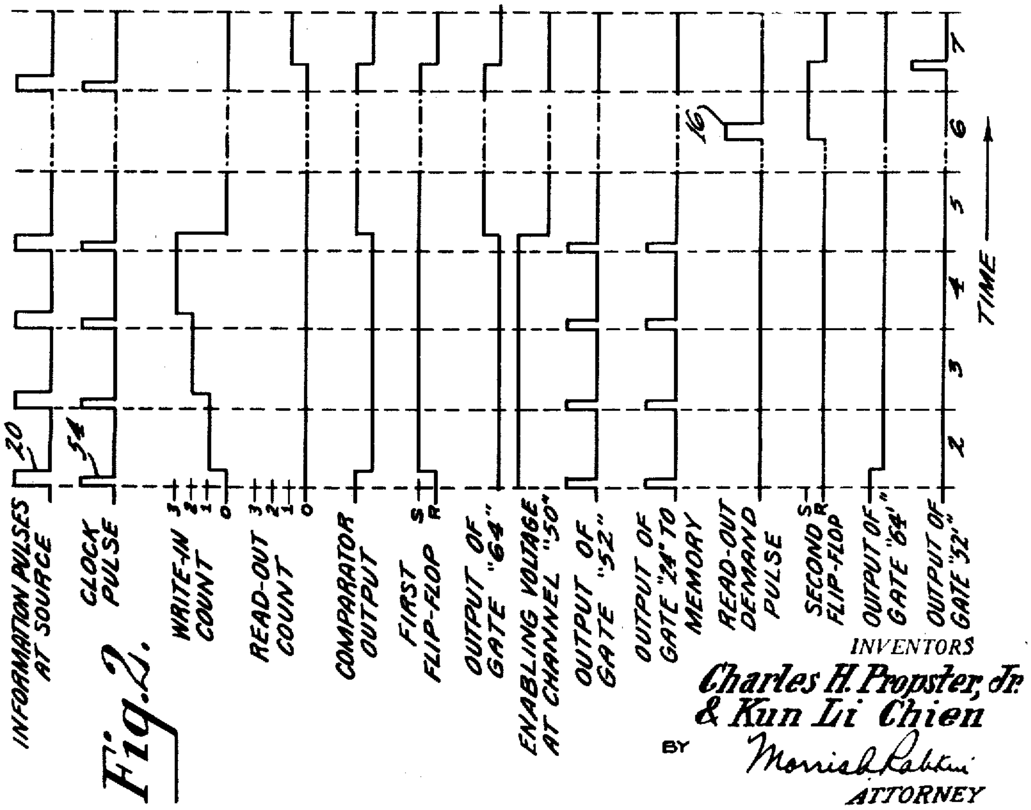
Figure 2 is an idealized timing graph showing the relationship of waveforms occurring at various portions of the system of Figure 1.

As initial conditions, both the flip-flops 62 and 72 are reset, the memory is empty, and the write-in and read-out counters 34, 34' both register zero. These initial conditions are shown in time interval 1 in the waveform graph of Figure 2. Since the write-in and read-out counts are equal the comparator 48 supplies a high voltage to the gate 64. A low voltage is applied to the other input of the gate 64 from the 1-output of the first flip-flop 62, which is reset. Accordingly, the output of the gate 64 is low, and the voltage applied through the inverter 66 to the inhibit input 68 of gate 52 is a high enabling level. It is assumed for the present that during time interval 1 a high enabling voltage from the source 12 is present on channel 50. The inhibit gate 52 is, therefore, open, and the clock pulse 54 (time interval 2) corresponding to the first information character from the source 12, is passed through that gate 52 and applied to the input gates 24. The first character on channels 22 is passed by the gates 24 and applied to the memory 14, The clock pulse passed by the gate 52 is also applied to the matrix gates 46. The first matrix output 41 corresponding to a write-in count of zero is the only one that has a high voltage. Thus, only the first memory location is pulsed for writing in the first character in accordance with the zero count of the write-in counter.

The pulse from the inhibit gate 52 is also applied through the delay line 58 to the write-in counter 34 to change the count to one. The delay of this pulse by the delay line 58 is of the order of the time duration of the pulse itself in order that the matrix gates 46 are closed before the write-in count is changed. At about the same time, the pulse from the inhibit gate 52 is applied through the delay line 60 to set the first flip-flop 62. The counts in the write-in and read-out counters 34, 34' are now unequal, resulting in a low-voltage comparator output. Thus, the output of the gate 64 is still low, and the voltage at the inhibit input 68 of gate 52 remains at a high enabling level.

During time interval 3, the inhibit gate 52 is still open to pass the clock pulse 54 corresponding to the second information character from the source 12. The second character is written in the memory 14 in a second location corresponding to the write-in count of one. The write-in counter 34 is then advanced to a count of two. In the same way, during time interval 4, the third character from the source is written in a third memory location corresponding to the write-in count of two, and then the counter is advanced to a count of three. During time interval 5, the fourth character from the source is written in a fourth memory location corresponding to a write-in count of three, and the memory 14 is filled. The advance of the counter 34 following write-in of the fourth character recycles the counter 34 to a count of zero. Since the write-in and read-out counts are now both zero the comparator output is changed to a high voltage level. The 1-output of the first flip-flop 62, which is set, is also high, and the output of gate 64 is high. Therefore, a low inhibit voltage is applied to the inhibit gate 52 to close that gate 52 to subsequent clock pulses 54. The output voltage from the gate 64 is also applied to the information source to cause the removal of the enabling voltage on channel 50. When the memory 14 is full, the write-in operations are terminated.

During time interval 6, a first read-out demand pulse 16 from the output device 10 sets the second flip-flop 72. At the beginning of time interval 7, the first flip-flop 62 is still in the set condition due to the previous write-in operations. Thus, the output of the gate 64' is low which results in an enabling voltage at the inhibit terminal 68' of the read-out inhibit gate 52'. Accordingly, the next clock pulse 54 from the source 12 is passed by the read-out inhibit gate 52' and applied to the read-out matrix gates 46'. Since the read-out counter registers zero at this time, only the first one of the matrix outputs 41' is at a high-voltage level. Thus, a read-out pulse is applied only to the first memory location which corresponds to the read-out count of zero. Therefore, the first information character that was written in is the first read out. The signals making up this character are amplified in the amplifiers 28 and applied to the output device 10.

During time interval 7, the read-out counter 34' is advanced to a count of one and both the first and second flip-flops 62, 72 are reset. Since the read-out and write-in counts are now unequal, the enabling voltage remains at terminal 68' of the read-out inhibit gate 52'. When the second read-out demand pulse 16 occurs, the inhibit gate 52' is opened to pass the next clock pulse 54. This time the second character stored in the memory 14 is read out in accordance with the read-out count of one. The read-out counter 34' is then advanced to a count of two. The third and fourth read-out demand pulses result in the same operation and the third and fourth information characters are read-out of the memory 14. At that time, the read-out and write-in counts are both zero, and the first flip-flop 62 is reset. As a result a low, inhibiting voltage level is applied to terminal 68' to close the read-out inhibit gate 52' to succeeding clock pulses 54. Accordingly, when the memory 14 is empty there can be no further read-out until information is again written into the memory.

When the write-in and read-out counts are equal, and when the previous operation was a write-in of a character in the memory, the memory 14 is full. Accordingly, an inhibiting voltage is applied to terminal 68 of the write-in inhibit gate 52 to prevent further write-in of information from the source 12. At that time there is an enabling voltage at terminal 68' of gate 52' to permit read-out upon demand. When the read-out and write-in counts are equal and the previous operation was a read-out, the memory is empty. Consequently, an inhibit voltage is applied to terminal 68' of the read-out inhibit gate 52' to prevent further read-out, and an enabling voltage is applied to terminal 68 of the write-in inhibit gate 52 to permit additional write-in of information. The change in voltage at the gate 64 is a signal to the information source 12 that additional information can be written in the memory 14. When the source 12 is ready to supply the next information character in the proper sequence an enabling voltage is produced on channel 50. The write-in inhibit gate 52 is then open, and the memory is refilled in the manner described above.

When the write-in and read-out counts are unequal, the comparator output voltage is such that enabling voltages are applied to the inhibit terminals 68, 68' of both the write-in and read-out gates 52, 52'. Under these conditions, the memory is neither full nor empty and either write-in or read-out may take place. If the next signal received by the memory control system is a read-out demand pulse, the proper information character is read-out of the memory 14 without waiting. However, if the enabling voltage on channel 50 occurs first, indicating the source is ready to supply information characters in the proper sequence, then these characters are written in the memory 14. If the read-out demand pulse 16 and the enabling voltage on channel 50 occur at about the same time, both inhibit gates 52, 52' are open at the same time to pass the next clock pulse 54. This clock pulse 54 is delayed by the delay line 70 so that the write-in inhibit gate 52 passes the clock pulse before it is passed by the read-out inhibit gate 52'. The delay of the delay line 70 is such that the write-in operation is completed before the read-out operation is started. In this way, any undesirable operation that might occur due to the memory 14 being actuated by simultaneous write-in and read-out pulses is prevented.

Once the source 12 is in condition to supply information in the proper sequence, the information is delivered at a faster rate than the output device 10 can operate. Generally, some "get ready" time is required in order for the source 12 to find the place where it stopped delivering information previously and start again in the proper sequence. This "get ready" time, for some applications may be greater than the time for a plurality of operations by the output device. For example, consider a situation in which the source 12 includes a magnetic drum that rotates one revolution in a fraction of a second while the output device 10 performs four operations in the same time. The "get ready" time of such a drum to rotate to the position for supplying the proper character in sequence may be as much as the time for four operations of the output device 10. Similarly, where the source 12 incorporates a magnetic tape that is intermittently operated, the "get ready" time may be the time necessary to get the tape started.

With the system of this invention, the output device 10 is not held up during the "get ready" time of the source 12. The capacity of the memory 14 is made sufficiently large to continue to supply information to the output device 10 over the "get ready" time period of the source 12. Thus, the minimum memory capacity is selected as approximately equal to the maximum "get ready" time of the source 12 divided by the shortest time between output-device operations. Once the source 12 is ready, it supplies information to the memory 14 at a faster rate than the information is read out. The source 12 continues to supply information until the memory 14 is refilled.

To summarize the above, information is read into the memory at the rate of the information source 12. The stored information is read out of the memory 14 at the rate of the output device 10 upon its demand and in the same sequence that it was written in. Information is written into the memory 14 to refill it at every opportunity. The output device 12 need never wait for information to be supplied to it, and hence, can operate at maximum speed.

Appropriate forms of gate circuits that may be employed are described in the article "Diode Coincidence and Mixing Circuits" by Tung Chang Chien in Proc. of the I.R.E., May 1950, page 511. The flip-flops may be any bistable multivibrator such as the Eccles-Jordan trigger circuit. A description of an appropriate form of counter is found in the book "High Speed Computing Devices" McGraw-Hill, 1950, page 18 ff. At page 42 ff. of the same book, there is a description of an appropriate form of converter matrix.

Figure 3:
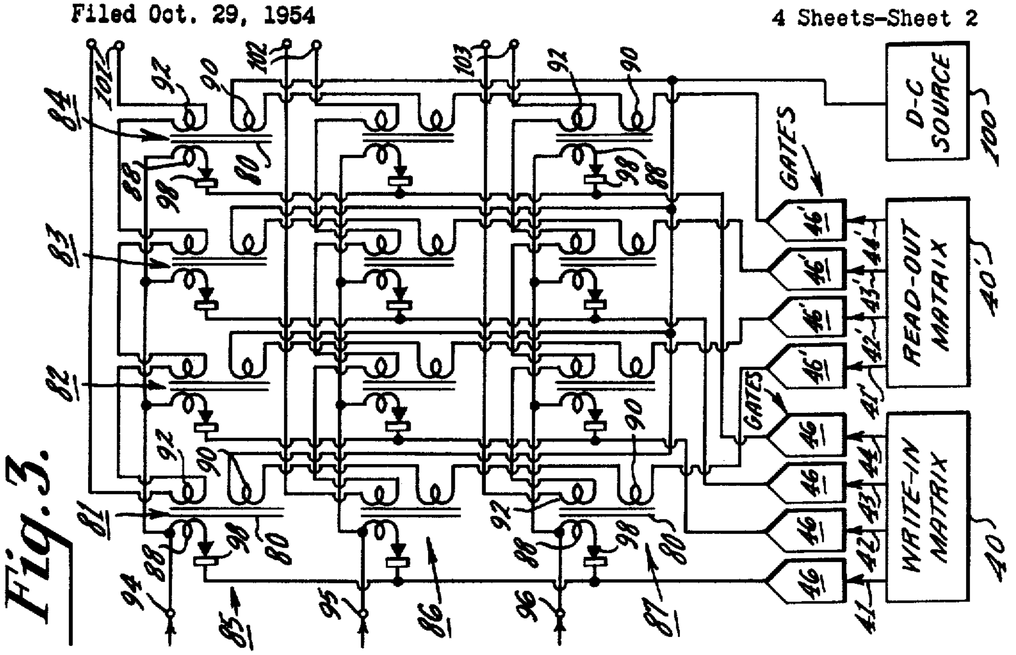
Figure 3 is a schematic circuit diagram of a random access memory that may be employed in the system of Figure 1.

An appropriate form of random access memory is shown in Figure 3. A plurality of saturable magnetic cores 80 are shown arranged in columns 81 to 84 and rows 85, 86, 87. Each row of cores 85 to 87 corresponds to a different one of the information channels 22. Each column of cores 81 to 84 provides a different memory location for storing an information character. Individually linked to the cores 80 are separate write-in, read-out and output coils, 88, 90 and 92, respectively. A separate input terminal 94, 95, 96 for each information channel 22 is connected to all the write-in coils 88 of the corresponding row of cores, 85, 86, 87, respectively. The other ends of these write-in coils 88 are connected through separate diodes 98 and the matrix gates 46 to the matrix outputs 41 to 44. Each write-in matrix output 41 to 44 is connected to all of the write-in coils 88 of a different one of the core columns 81 to 84, respectively. A direct voltage source 100 is connected to all of the read-out coils 90. The read-out coils 90 of each core column 81 to 84 are connected in series and to a different one of the read-out matrix outputs 41' to 44', respectively through the matrix gates 46'. The output coils 92 of each core row 85, 86, 87 are connected in series and to a different output terminal 101, 102, 103, respectively.

All the cores 80 are assumed to be initially in one state of saturation N. Current flow through write-in coils in forward direction of the diodes 98 tends to drive the cores 80 to the opposite state of saturation P. If a positive pulse of appropriate amplitude is applied to one of the input terminals, say 94, and a negative write-in pulse appears on the first matrix output 41, the coil 88 of the core 80 in the first row 85 and first column 81 is energized and that core is driven to state P. The voltage levels at the other matrix outputs 42, 43 and 44 remain sufficiently high to block current flow in the write-in coils 88 of the other columns 82, 83 and 84, respectively. (By appropriate phase inverters (not shown) in the matrix output channels 41 to 44, the proper voltage levels in relation to those described above may be provided.) To read out the core 80 in the first row and column 85, 81, a pulse is applied to matrix output 41′. The core is driven back to state N inducing a pulse in the output coil 92 which appears at the output terminals 101.

When the first write-in matrix output 41 receives a write-in pulse, the first character is written in the first core column 81. When the second matrix output 42 receives a write-in pulse, the second character is written in the second core column 82, and so on. Similarly, read-out pulses on the matrix outputs 41′ to 44′ in order result in the characters being read out in the proper sequence.

Figure 4:
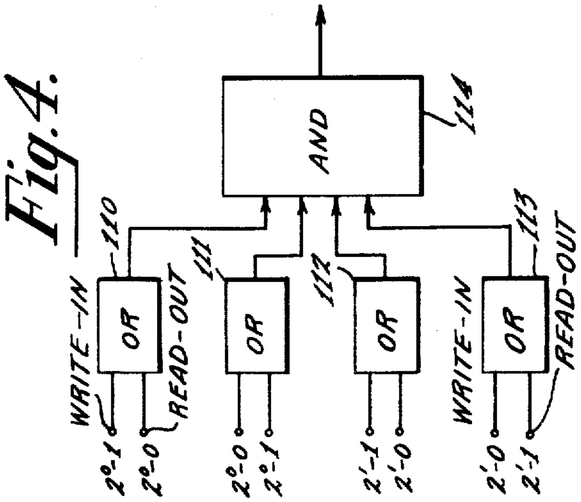
Figure 4 is a schematic block diagram of a comparator that may be employed in the system of Figure 1.

Referring to Figure 4, a comparator is shown which may be employed in the apparatus of Figure 1. Four two-input "or" gates 110 to 113 are employed, the outputs of which are connected to a four-input "and" gate 114. The 1-output of the $2^0$ stage 36 of the write-in counter 34 is connected to the first "or" gate 110. The 0-outplt of the $2^0$ stage 36′ of the read-out counter 34′ is also connected to the first "or" gate 110. The 0-output of the $2^0$ stage 36 of the write-in counter 34 is connected to the second "or" gate 111, and the 1-output of the $2^0$ stage 36′ of the read-out counter 34′ is also connected to the second "or" gate 111. In a similar manner, the outputs of the $2^1$ stages 38, 38′ of the write-in and read-out counters 34, 34′ are connected to the third and fourth "or" gates 112, 113; the upper input to the "or" gates being from the write-in counter 34, and the lower input from the read-out counter 34′. If the counts registered in the write-in and read-out counters 34, 34′ are the same, then the output of each one of the "or" gates 110 to 113 is at a high voltage level. Accordingly, the output of the "and" gate 114 (which is the output of the comparator 48) is also at a high voltage level. If the write-in and read-out counters 34, 34′ do not have the same counts, then at least one of the "or" gate outputs is at a low voltage level so that the output of the "and" gate 114 is also low.

Figure 5:
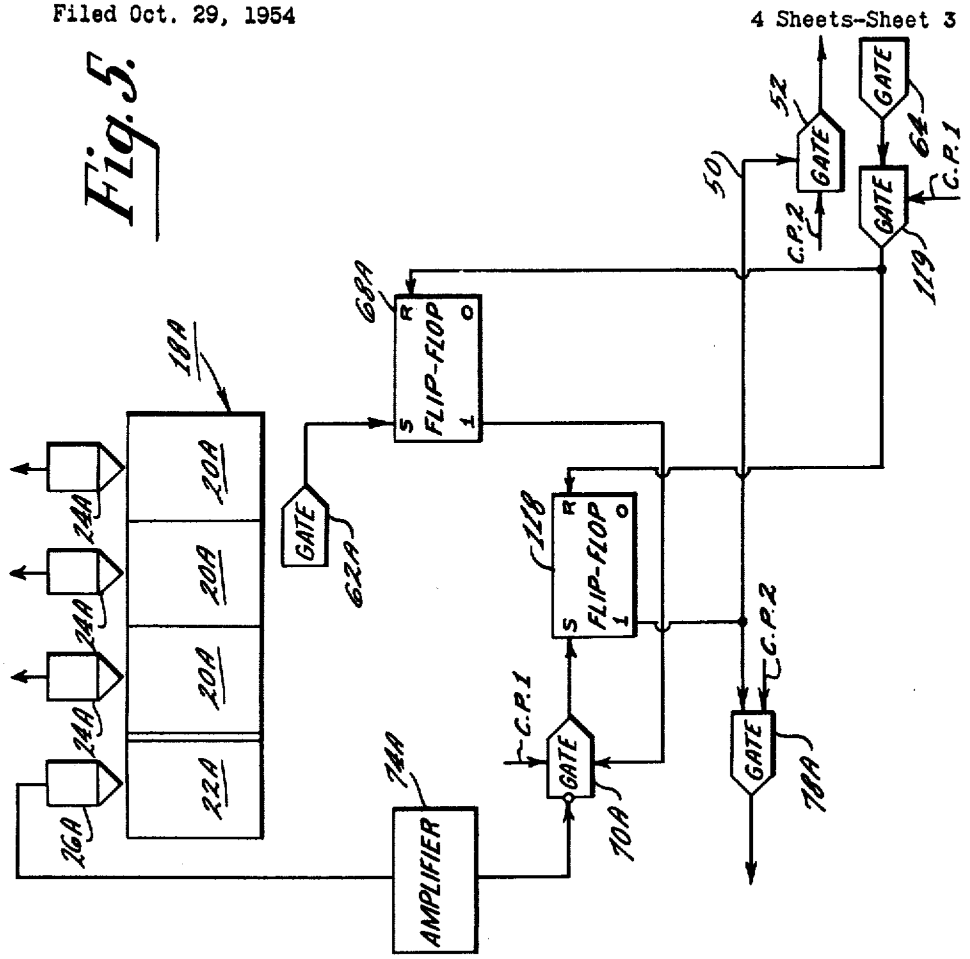
Figure 5 is a schematic block diagram of a portion of an information source that may be employed in the system of Figure 1.

An appropriate form of information source is described in the copending application, Serial Memory System, Serial No. 447,162, filed August 2, 1954 by the same applicants as this application, and assigned to the same assignee as this application. Described in the above cited application is a system for reading out information intermittently from a magnetic drum in the proper sequence. The system shown in Figure 1 of that application may be modified as shown here in Figure 5 for reading out a plurality of characters during the same drum revolution. The parts shown in Figure 5 corresponding to those described in the above cited application are referenced by the same numerals with the addition of the letter A. The one-shot multivibrator of the above cited application is replaced by an additional flip-flop 118 to provide an enabling voltage level instead of a pulse. This enabling voltage level from flip-flop 118 is employed as the voltage on channel 50 of the present application. The additional flip-flop 118 and the second flip-flop 68A described in the above cited application are reset by a clock pulse that is passed by gate 119 whenever the output of gate 64 (of the present application) is a high voltage. So modified, the first flip-flop 66 (and gate 64) and output gates 36 of the above cited application would be eliminated, since their functions are provided in effect by the gate 64 and gates 24, respectively, of the present application.

Where the information source 12 is such that clock pulses cannot be continuously supplied when the source is not supplying information characters, an auxiliary clock pulse generator (not shown) may be employed for the read-out clock pulses.

Figure 6:
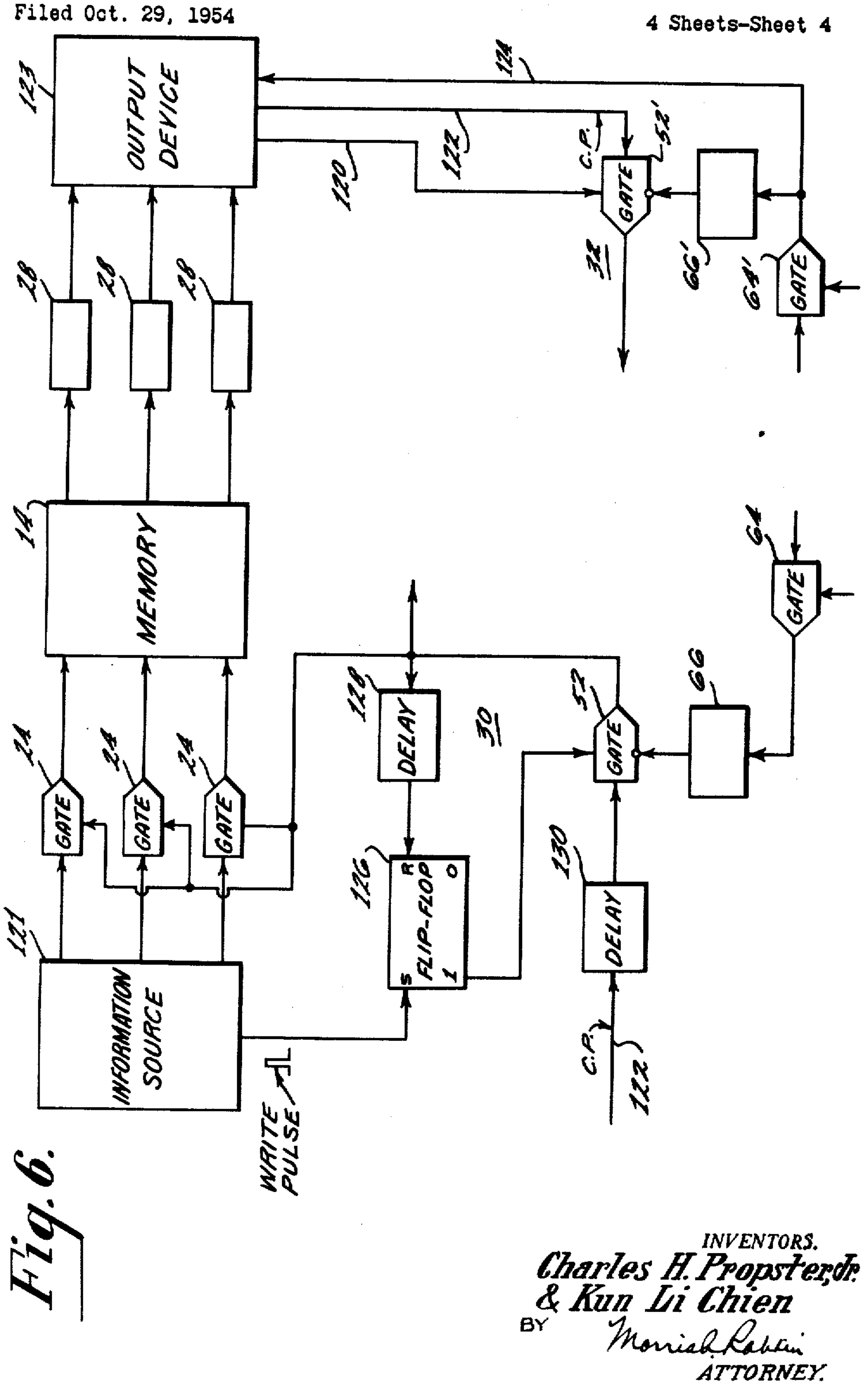
Figure 6 is a schematic block diagram of a modification of the system of Figure 1.

Shown in Figure 6 is a modification of the system of Figure 1 for transferring information from a source 121 operating at a relatively low rate to an output device 123 operating at a relatively high rate. The same reference numerals are used for parts previously described. The output device 123 supplies an enabling voltage level through channel 120 directly to gate 52′ whenever it is "ready" to receive information in the proper sequence. The output device 123 may also supply clock pulses on channel 122 for gates 52 and 52′. The gate 64′ supplies different voltage levels to the output device 123 through channel 124 accordingly as the memory 14 is empty or contains information to be read out. When there is information in the memory 14, and the output device is "ready," gate 52′ passes successive clock pulses to empty the memory 14 in a manner similar to that described above.

The source 121 supplies a "write pulse" to set flip-flop 126 when it is ready to write a character in the memory 14. Flip-flop 126 provides an enabling voltage for gate 52, the output of which resets the flip-flop 126 through delay line 128. Thus, gate 52 remains open for only a single write-in operation. The clock pulse is applied to gate 52 through delay line 130 to prevent simultaneous read-out and write-in. The system of Figure 6 is otherwise the same as Figure 1 with other corresponding parts being omitted.

The system of Figure 6 may employ as an output device a magnetic drum memory system of the type described in the patent application entitled "Serial Memory System" Serial No. 465,666, filed October 29, 1954 by the same applicants as this application.

It is evident from the above description of this invention that a new and improved system is provided for transferring information between information handling devices that operate at widely different rates. The information transfer is in the proper sequence, and the slower operating device can operate at maximum speed. The apparatus employed is reliable and economical.

What is claimed is:

1. An information storage system comprising means for providing writing signals, means for providing reading signals, a memory having a predetermined capacity for storing a plurality of information units, an input device for supplying information units, means responsive to said writing signals for writing said information units from said input device as supplied thereby into said memory, means responsive to said reading signals for reading said information units from said memory, counting means responsive to said reading and writing signals to determine the fullness of said memory, and means responsive to said counting means for actuating said input device to supply information whenever said memory is less full than its said capacity.

2. An information storage system comprising means for providing writing signals, means for providing reading signals, a memory having a predetermined capacity for storing a plurality of information units, an input device for supplying serially in order information units, means responsive to said writing signals for writing said information units from said input device as supplied thereby into said memory, means responsive to said reading signals for reading said information units from said memory in the same said serial order, counting means responsive to said reading and writing signals to determine the fullness of said memory, and means responsive to said counting means for actuating said input device to supply information in continued serial order whenever said memory is less than full to its said capacity.

3. An information storage system comprising a random access memory of predetermined capacity for storing a plurality of information units, an input device for supplying information units, means for writing said supplied information units into said memory in response to a writing signal, means for reading said information units from said memory in response to a reading signal, and means for regulating the writing of information into said memory, said regulating means including counting means responsive to said signals for determining when said memory is full to capacity and when less than full and means responsive to said counting means for activating said writing means whenever said memory is less than full and deactivating said writing means when said memory is full.

4. An information storage system comprising a memory having a predetermined capacity for storing a plurality of information units, an input device for supplying information units, means for writing said supplied units into said memory in response to writing signals, means for reading said information units from said memory in response to reading signals, and means for regulating said input device including counting means responsive to said signals for determining when said memory is full to capacity and when less than full and means responsive to said counting means for enabling said input device to supply information to said writing means when said memory is less than full and before it is empty and for inhibiting said input device when said memory is full.

5. An information storage system as recited in claim 4 wherein said input device includes gate means for supplying said information units to said writing means, and said means for enabling and inhibiting said input device includes means for respectively applying gate-opening and gate-closing signals to said gate means.

6. An information storage system comprising a random access memory having a predetermined capacity for storing a plurality of information units, a cyclic storage system for supplying information units to said memory in a predetermined sequence, means responsive to writing signals for writing said supplied information units into said memory as supplied by said cyclic storage system, means responsive to reading signals, for reading said information units from said memory in the same sequence, counting means responsive to said reading and writing signals to determine the fullness of said memory and means responsive to said counting means for actuating said cyclic storage system to supply information to said writing means in continued sequence whenever said memory is less than full.

7. An information storage system comprising a memory having a predetermined capacity for storing a plurality of information units, means for writing information units into said memory, means for reading said information units from said memory, counting means responsive to said writing signals and to said reading signals to determine the degree to which said memory is full, and means responsive to said counting means for actuating said reading means to read out information whenever an information unit is written into said memory.

8. An information storage system comprising a memory having a predetermined capacity for storing a plurality of information units, means responsive to writing signals for writing information units into said memory, means responsive to reading signals for reading said information units from said memory, and means for regulating the reading of information from said memory, said regulating means including counting means responsive to said signals for determining when said memory is empty and when not empty and means responsive to said counting means for activating said reading means whenever said memory is not empty and for deactivating said reading means when said memory is empty.

9. In a system having an information storage device of predetermined capacity, and means for writing units of information into said storage device in response to writing signals and for reading said information units out of said storage device in response to reading signals, apparatus for regulating writing of information units into said storage device comprising counting means responsive to said signals for counting the quantities of information units written into and read out of said storage device, means for comparing said quantities counted in said counting means, and means responsive to said comparing means for producing two different signals accordingly as said written-in and read-out quantities are equal or unequal, and means responsive to said unequal signals for enabling writing of information in said storage device.

10. Apparatus as recited in claim 9, wherein said comparing means includes separate means for cyclically counting the quantities of written-in and read-out information units, each of said counting means having a predetermined counting capacity equal to said storage device capacity.

11. Apparatus as recited in claim 10, and further comprising means coupled between said counting means and said storage device for designating in said storage device in accordance with the counts registered in said counting means the storage locations for information units to be written in and read out.

12. In a system having an information storage device of predetermined capacity, and means for writing units of information into and reading said information units out of said storage device, apparatus for regulating reading of information units out of said storage device comprising means for comparing the quantities of information units written into and read out of said storage device and for producing two different signals accordingly as said written-in and read-out quantities are equal or unequal, and means responsive to said equal signals for inhibiting the reading of information out of said storage device, and means responsive to said equal signals for enabling the reading of information out of said storage device.

13. In a system having an information storage device of predetermined capacity, and means for writing units of information in and reading said information units out of said storage device, apparatus for regulating reading of information units out of said storage device comprising means for counting the quantities of information units written in and read out of said storage device and means for comparing said quantities counted by said counting means for producing equal signals and unequal signals accordingly as said written-in and read-out quantities are equal or unequal, means for producing write in and read out signals accordingly as information units are written in or read out of said storage device, and means responsive to joint occurrence of said equal signals and said read out signals for inhibiting said reading of information and to joint occurrence of said unequal signals or to sole occurrence of said unequal signals for enabling said reading of information.

14. Information storage apparatus comprising an information storage device, means for writing units of information in said storage device, means for reading said information units out of said storage device, means for producing timing pulses in a predetermined time relation to said information units to be written in, means for comparing the relative numbers of the information units written in and read out of said storage device and for producing two different signals accordingly as said written-in and said read-out quantities are equal or unequal, means for deriving another signal from said timing pulse, means responsive to the joint occurrence of both said unequal signal and a timing pulse for actuating said writing means to write information in said storage device, means responsive to joint occurrence of said equal signal and said another signal for inhibiting said writing means, and means responsive to joint occurrence of a timing pulse and said unequal signal for actuating said reading means to read out information, the actuation of said reading means occurring a predetermined time after said actuating of said writing means.

15. Information storage apparatus comprising an information storage device, means responsive to an actuating signal for writing units of information in said storage device including recycling means for counting said information units written in said storage device, and means responsive to the counts registered in said counting means for designating the storage locations in said storage device for information units to be written in, means responsive to an actuating signal for reading units of information out of said storage device including recycling means for counting said information units read out of said storage device, and means responsive to the counts registered in said read-out counting means for designating the storage locations for information units to be read out, means for comparing the counts registered in said write-in and read-out counting means and for producing two different first signals accordingly as said counts are equal or unequal, means for producing two different second signals accordingly as said information units are written in or read out of said storage device, means for producing timing pulses in a predetermined time relation to said information units to be written in, first gate means responsive to the joint occurrence of said equal first signal, said read-out second signal and one of said timing pulses, second gate means responsive to the joint occurrence of said unequal first signal and one of said timing pulses, "or" circuit means responsive to the output of either of said gate means connected for applying an actuating signal to said writing means to write an information unit in said storage device and for applying the same said actuating signal to said write-in counting means to change the count of said write-in counting means, third gate means responsive to the joint occurrence of said equal first signal, said read-in second signal and one of said timing pulses fourth gate means responsive to the joint occurrence of said unequal first signal and one of said timing pulses, and "or" circuit means responsive to the outputs of said third and fourth gate means for applying an actuating signal to said reading means to read out an information unit from said storage device and to change the count of said read-out counting means, said actuating signal being applied to said reading means a predetermined time delay after the application of said actuating signal to said writing means.

16. In a system having an information storage device of predetermined capacity, and means for writing units of information into said storage device and for reading said information units out of said storage device, apparatus for regulating writing of information units into said storage device comprising means for comparing the quantities of information units written into and read out of said storage device and for producing two different signals accordingly as said written-in and read-out quantities are equal or unequal, means responsive to said unequal signals for enabling writing of information into said storage device, and means responsive to said equal signals for inhibiting writing of information in said storage device.

17. An information storage system comprising a random access memory having different memory locations, an information source for supplying information units to said memory, a write-in counter, a read-out counter, means for writing into said memory at locations under control of said write-in counter, means for reading out of said memory at locations under control of said read-out counter, means for advancing the count of said write-in counter for each of said units written into said memory, means for advancing the count of said read-out counter for each said unit read-out of said memory, means for comparing the counts in said counters to provide a signal indicative of equality, and means responsive to said equality signal for inhibiting said reading out means.

References Cited in the file of this patent

UNITED STATES PATENTS

| | | |
|---|---|---|
| 2,575,329 | Blanton | Nov. 20, 1951 |
| 2,614,169 | Cohen | Oct. 14, 1952 |
| 2,652,501 | Wilson | Sept. 15, 1953 |

OTHER REFERENCES

National Bureau of Standards Report entitled, "System Organization of the Dyseac," by Leiner, August 1953 (pp. 10–13).

"Review of Input and Output Equipment Used in Computing Systems," Joint AIEE-IRE-ACM Computer Conference, March 1953.

"Trends in Computers," Proceedings of the Western Computer Conference, April 1954 (pages 140–154).